(12) United States Patent
Fujiwara et al.

(10) Patent No.: US 8,119,738 B2
(45) Date of Patent: Feb. 21, 2012

(54) POLYPROPYLENE RESIN COMPOSITION

(75) Inventors: Yasuki Fujiwara, Ichikawa (JP); Shuichi Kimata, Ichihara (JP); Hideki Oshima, Bartlesville, OK (US)

(73) Assignee: Sumitomo Chemical Company, Limited, Tokyo (JP)

( * ) Notice: Subject to any disclaimer, the term of this patent is extended or adjusted under 35 U.S.C. 154(b) by 130 days.

(21) Appl. No.: 12/515,135

(22) PCT Filed: Dec. 14, 2007

(86) PCT No.: PCT/JP2007/074601
§ 371 (c)(1),
(2), (4) Date: May 28, 2009

(87) PCT Pub. No.: WO2008/072792
PCT Pub. Date: Jun. 19, 2008

(65) Prior Publication Data
US 2010/0048822 A1    Feb. 25, 2010

(30) Foreign Application Priority Data

Dec. 15, 2006 (JP) ................................. 2006-338994

(51) Int. Cl.
C08F 8/00 (2006.01)
C08L 23/00 (2006.01)
C08L 23/04 (2006.01)
C08L 23/10 (2006.01)
(52) U.S. Cl. .................................. 525/191; 525/240
(58) Field of Classification Search .................. 525/191, 525/240
See application file for complete search history.

(56) References Cited

U.S. PATENT DOCUMENTS
5,134,209 A    7/1992    Job et al.
2001/0014719 A1    8/2001    Suzuki et al.

FOREIGN PATENT DOCUMENTS
| EP | 0534776 A1 | 3/1993 |
| JP | 58017139 A | 2/1983 |
| JP | 8-311271 A | 11/1996 |
| JP | 09-151282 A | 6/1997 |
| JP | 10-087714 A | 4/1998 |
| JP | 11291279 A | 10/1999 |
| JP | 11293062 A | 10/1999 |
| JP | 2003-147035 A | 5/2003 |

*Primary Examiner* — Nathan M Nutter
(74) *Attorney, Agent, or Firm* — Panitch Schwarze Belisario & Nadel LLP

(57) ABSTRACT

There are provided a polypropylene resin composition and a molded article thereof, the composition comprising:

60 to 85% by weight of a propylene homopolymer; and
15 to 40% by weight of an ethylene-α-olefin random copolymer containing 45 to 70 parts by mol of ethylene units, and 30 to 55 parts by mol of α-olefin units, and satisfying the following requirements (1) to (5), (1) the propylene homopolymer has a melting temperature of 163 to 170° C.;
(2) the propylene homopolymer contains 0.01% or less of regio defects resulted from a 2,1-insertion and a 1,3-insertion in all propylene units;
(3) the polypropylene resin composition has a ratio B/A of 0.9 or more, provided that A (% by weight) is an amount of the ethylene-α-olefin random copolymer contained in the polypropylene resin composition, and B (% by weight) is an amount of soluble parts in xylene at a room temperature contained in the polypropylene resin composition;
(4) the ethylene-α-olefin random copolymer has a molecular weight distribution of 2.0 to 4.0; and
(5) the ethylene-α-olefin random copolymer contained in the polypropylene resin composition has a shape of a particle, whose volume-average particle diameter is 1.0 μm or less, measured by observing a cross-section of a 0.5 mm-thick sheet with a transmission electron microscopy, the sheet being obtained by hot press-molding the above polypropylene resin composition at 190° C. for 3 minutes under a pressure of 35 kgf/cm², provided that the cross-section of the above particle has a round shape.

2 Claims, No Drawings

POLYPROPYLENE RESIN COMPOSITION

CROSS-REFERENCE TO RELATED APPLICATION

This application is a section 371 of International Application No. PCT/JP2007/074601, filed Dec. 14, 2007, which was published in the Japanese language on Jun. 19, 2008 under International Publication No. WO 2008/072792 A1 and the disclosure of which is incorporated herein by reference.

TECHNICAL FIELD

The present invention relates to a polypropylene resin composition. For more detail, the present invention relates to a polypropylene resin composition, which is useful as a material for molded articles excellent in their stiffness and impact resistance.

BACKGROUND ART

Molded articles comprising polypropylene are used for various applications because of their excellent stiffness, heat resistance and surface gloss.

It has been known in the art to use polypropylene compositions containing polypropylene and an ethylene copolymer, in order to improve impact resistance of polypropylene.

For example, JP 10-87714A discloses a process for producing a propylene polymer composition, which process comprises the steps of producing a propylene polymer with a non-metallocene catalyst, and then producing an elastomer with a catalyst consisting of at least a metallocene compound and a cocatalyst component.

However, a polypropylene composition disclosed in the above patent literature is not necessarily sufficient in its stiffness and impact resistance, and therefore it has been desired to improve stiffness and impact resistance of a polypropylene composition.

DISCLOSURE OF INVENTION

An object of the present invention is to provide a polypropylene resin composition excellent in its stiffness and impact resistance.

The present invention is a polypropylene resin composition comprising:
  60 to 85% by weight of a propylene homopolymer; and
  15 to 40% by weight of an ethylene-α-olefin random copolymer containing 45 to 70 parts by mol of ethylene units, and 30 to 55 parts by mol of α-olefin units, and satisfying the following requirements (1) to (5),
  (1) the above propylene homopolymer has a melting temperature of 163 to 170° C. measured according to DSC;
  (2) the above propylene homopolymer contains 0.01% or less of regio defects measured by a $^{13}$C-NMR spectrum, the regio defects being resulted from a 2,1-insertion and a 1,3-insertion, provided that the total of propylene units in the above propylene homopolymer is 100%;
  (3) the above polypropylene resin composition has a ratio B/A of 0.9 or more, provided that A (% by weight) is an amount of the above ethylene-α-olefin random copolymer contained in the above polypropylene resin composition, and B (% by weight) is an amount of soluble parts in xylene at a room temperature contained in the above polypropylene resin composition;
  (4) the above ethylene-α-olefin random copolymer has a molecular weight distribution of 2.0 to 4.0; and
  (5) the above ethylene-α-olefin random copolymer contained in the above polypropylene resin composition has a shape of a particle, whose volume-average particle diameter is 1.0 μm or less, measured by observing a cross-section of a 0.5 mm-thick sheet with a transmission electron microscopy, the sheet being obtained by hot press-molding the above polypropylene resin composition at 190° C. for 3 minutes under a pressure of 35 kgf/cm$^2$, provided that the cross-section of the above particle has a round shape;
  wherein the total of the above propylene homopolymer and the above ethylene-α-olefin random copolymer is 100% by weight, and the total of the above ethylene units and the above α-olefin units is 100 parts by mol.

BEST MODE FOR CARRYING OUT THE INVENTION

Propylene Homopolymer

The propylene homopolymer contained in the polypropylene resin composition of the present invention has a melting temperature of 163 to 170° C. measured according to differential scanning calorimetry (DSC), and contains 0.01% or less of regio defects measured by a $^{13}$C nuclear magnetic resonance ($^{13}$C-NMR) spectrum, the regio defects being resulted from a 2,1-insertion and a 1,3-insertion, provided that the total of propylene units in the propylene homopolymer is 100%. The propylene homopolymer contains soluble parts in xylene at a room temperature in an amount of preferably 0.1% by weight or less.

The melting temperature of the propylene homopolymer measured according to DSC is preferably 164 to 170° C., and more preferably 165 to 170° C. When the melting temperature is lower than 163° C., molded articles comprising the resin composition may be insufficient in their stiffness.

When polymerizing a propylene monomer, it is polymerized usually with a 1,2-insertion, and is polymerized infrequently with a 2,1-insertion or a 1,3-insertion. The above "proportion of regio defects resulted from a 2,1-insertion and a 1,3-insertion in all propylene units" of the propylene homopolymer is the total of a proportion of regio defects resulted from a 2,1-insertion reaction and a proportion of regio defects resulted from a 1,3-insertion reaction, both regio defects existing in polypropylene molecular chains, measured by a $^{13}$C-NMR spectrum according to a method disclosed in POLYMER, 30, 1350 (1989) by Tsutsui, et al.

The propylene homopolymer used in the present invention contains 0.01% or less of regio defects resulted from a 2,1-insertion and a 1,3-insertion, preferably 0.008% or less, and more preferably 0.005% or less, provided that the total of propylene units is 100%. When it is more than 0.01%, molded articles comprising the resin composition may be insufficient in their stiffness.

The propylene homopolymer applicable to the present invention can be produced according to a polymerization method known in the art, using a stereoregular polymerization catalyst comprising a solid titanium catalyst component known in the art, an organometallic compound catalyst component, and an optional electron donor, or using a stereoregular polymerization catalyst comprising a metallocene complex known in the art, an organoaluminum compound, and an optional compound reacting with the metallocene complex to form a stable anion. A preferable example of the polymerization catalyst is a catalyst comprising a solid titanium catalyst component, an organometallic compound catalyst component, and an optional electron donor.

Examples of the polymerization method applicable to the present invention are a slurry polymerization method using an inert hydrocarbon solvent such as propane, butane, isobutene, pentane, hexane, heptane and octane; a solution polymerization method using an inert hydrocarbon solvent such as those mentioned above; a bulk polymerization method using an olefin as a medium, the olefin being liquid at a polymerization temperature; and a gas phase polymerization method.

The polymerization is carried out preferably at usually 20 to 100° C. and particularly preferably 40 to 90° C., under a pressure of an ordinary pressure to 6 MPa. A polymerization time is generally determined suitably according to a kind of a target polymer and a polymerization reaction apparatus, and is usually 1 minute to 20 hours.

Also, in order to regulate a molecular weight of polypropylene, a chain transfer agent such as hydrogen may be added.

The propylene homopolymer has a melt flow rate (referred to as "MFR" hereinafter) of preferably 0.1 to 500 g/10 minutes, and more preferably 0.3 to 300 g/10 minutes, the MFR being measured at 230° C. under a load of 21 N according to JIS K7210.

[Ethylene-α-Olefin Random Copolymer]

The ethylene-α-olefin random copolymer contained in the polypropylene resin composition of the present invention is obtained by copolymerizing ethylene with an α-olefin, and contains structural units derived from ethylene and structural units derived from the α-olefin.

Examples of the α-olefin are propene, 1-butene, 1-pentene, 1-hexene, 1-heptene, 1-octene, 4-methyl-1-pentene, vinylcyclohexane and vinylnorbornene.

An amount of the structural units derived from the α-olefin contained in the ethylene-α-olefin random copolymer in the present invention, namely, an amount of the α-olefin contained therein measured according to a $^{13}$C-NMR spectrum is 30 to 55% by weight, and preferably 35 to 50% by weight. When the amount of the α-olefin is smaller than 30% by weight, the polypropylene resin composition of the present invention may be insufficient in its impact strength, because the ethylene-α-olefin random copolymer is not high enough in its compatibility with the propylene homopolymer, and a crystalline component of polyethylene is formed in the ethylene-α-olefin random copolymer. When the amount of the α-olefin is larger than 55% by weight, the polypropylene resin composition of the present invention may be insufficient in its stiffness, because the ethylene-α-olefin random copolymer is too high in its compatibility with the propylene homopolymer.

The ethylene-α-olefin random copolymer in the present invention has an intrinsic viscosity ([η]) of preferably larger than 1.0 dl/g, more preferably larger than 1.5 dl/g, and particularly preferably larger than 2.0 dl/g, measured at 135° C. in TETRALINE.

The polypropylene resin composition containing the propylene homopolymer and the ethylene-α-olefin random copolymer has a ratio B/A of 0.9 or more, and more preferably 0.95 or more, provided that A (% by weight) is an amount of the ethylene-α-olefin random copolymer contained in the above polypropylene resin composition measured according to a $^{13}$C-NMR spectrum, and B (% by weight) is an amount of soluble parts in xylene at a room temperature contained in the above polypropylene resin composition. When the ratio is 0.9 or less, molded articles comprising the polypropylene resin composition may be poor in their impact strength, because the above ethylene-α-olefin random copolymer is too low in its random copolymerzability to contain enough amount of component giving impact strength.

From a viewpoint of impact strength of the resin composition of the present invention, the ethylene-α-olefin random copolymer has a ratio (Aw/An) of preferably 2.0 to 4.0 measured according to gel permeation chromatography (referred to as "GPC" hereinafter), the Aw being a weight-average molecular chain length, and the An being a number-average molecular chain length. Incidentally, the ratio Aw/An is equal to a ratio Mw/Mn measured according to GPC, Mw being a weight-average molecular weight, and Mn being a number-average molecular weight. The ratio Mw/Mn is generally referred to as a "molecular weight distribution", and therefore, the ratio Aw/An also means a molecular weight distribution.

In view of a balance among stiffness, toughness and impact resistance, the ethylene-α-olefin random copolymer contained in the polypropylene resin composition of the present invention has a shape of a particle, whose volume-average particle diameter (Dv) is 1.0 μm or less, and preferably 0.9 μm or less, measured by observing a cross-section of a 0.5 mm-thick sheet with a transmission electron microscopy, the sheet being obtained by hot press-molding the polypropylene resin composition at 190° C. for 3 minutes under a pressure of 35 kgf/cm$^2$, provided that the cross-section of the above particle has a round shape. When the Dv is more than 1.0 μm, the polypropylene resin composition may be poor in its impact strength.

The ethylene-α-olefin random copolymer applicable to the present invention can be produced according to a polymerization method known in the art, using a catalyst comprising a solid titanium catalyst component known in the art, an organometallic compound catalyst component, and an optional electron donor, or using a catalyst comprising a metallocene complex known in the art, an organoaluminum compound, and an optional compound reacting the metallocene complex to form a stable anion, which catalysts are similar to those in the section [propylene homopolymer] mentioned above. An example of a preferable polymerization catalyst is a catalyst comprising the metallocene complex.

The above Dv of dispersed particles of the ethylene-α-olefin random copolymer contained in the polypropylene resin composition can be regulated by melt-kneading the polypropylene resin composition under suitable conditions.

The ethylene-α-olefin random copolymer applicable to the present invention can be produced preferably by polymerization using a catalyst comprising a metallocene complex.

[Polypropylene Resin Composition]

The polypropylene resin composition of the present invention comprises 60 to 85% by weight of the above propylene homopolymer, and 15 to 40% by weight of the above ethylene-α-olefin random copolymer, the total of the propylene homopolymer and the ethylene-α-olefin random copolymer being 100% by weight.

When the content of the above propylene homopolymer is more than 85% by weight (namely, when the content of the above ethylene-α-olefin random copolymer is less than 15% by weight), the polypropylene resin composition may be insufficient in its impact strength. When the content of the above propylene homopolymer is less than 60% by weight (namely, when the content of the above ethylene-α-olefin random copolymer is more than 40% by weight), the polypropylene resin composition may be insufficient in its stiffness.

The content of the above propylene homopolymer is preferably 65 to 85% by weight, and the content of the above ethylene-α-olefin random copolymer is preferably 15 to 35% by weight.

If desired, the polypropylene resin composition of the present invention may contain inorganic fillers. In that case, the content of the inorganic fillers is preferably 5 to 20% by weight, the total of the polypropylene resin composition being 100% by weight.

Also, if desired, the polypropylene resin composition of the present invention may contain additives such as heat stabilizers, nucleating agents (for example, aluminum salts of aromatic carboxylic acids, aromatic phosphate salts, and dibenzylidene sorbitol), ultraviolet absorbers, lubricants, antistatic agents, flame retardants, pigments, dyes, antioxidants (for example, phenol-based, sulfur-based and phosphorus-based antioxidants), dispersing agents, copper inhibitors, neutralizing agents, blowing agents, plasticizers, bubble inhibitors, cross-linking agents, flow improvers (for example, peroxides), light stabilizers, and weld-strength improvers. The content thereof is usually 0.0001 to 10 parts by weight, per 100 parts by weight of the polypropylene resin composition of the present invention.

When using the polypropylene resin composition of the present invention, the resin composition may contain, if desired, other polymers blended therewith than the propylene homopolymer and the ethylene-α-olefin random copolymer, such as polyethylene and a propylene-ethylene random copolymer. The blending amount thereof is usually about 5 to 20 parts by weight, per 100 parts by weight of the polypropylene resin composition.

The polypropylene resin composition of the present invention can be produced according to a method exemplified below:

(1) a method comprising the steps of producing the above propylene homopolymer, and successively, polymerizing the above ethylene-α-olefin random copolymer;

(2) a method comprising the step of melt-kneading all together the above propylene homopolymer with the above ethylene-α-olefin random copolymer;

(3) a method comprising the steps of charging sequentially the above propylene homopolymer and the above ethylene-α-olefin random copolymer into a mixing apparatus, and then melt-kneading; and (4) a method comprising the steps of mixing the propylene homopolymer with the ethylene-α-olefin random copolymer in a substance dissolving the both polymers, and then pouring the mixture into a substance not-dissolving the both polymers, thereby precipitating the polypropylene resin composition.

Among them, preferred is the method (4), which is excellent in its dispersibility of the above ethylene-α-olefin random copolymer in the polypropylene resin composition.

Examples of the substance dissolving both the propylene homopolymer and the ethylene-α-olefin random copolymer are high-boiling hydrocarbon compounds represented by TETRALINE, decalin, toluene, xylene and o-dichlorobenzene. Examples of the substance not-dissolving both the propylene homopolymer and the ethylene-α-olefin random copolymer are methanol, ethanol, isopropyl alcohol, butanol and acetone.

Examples of applications of the polypropylene resin composition of the present invention are various automobile materials and home electric materials. Resin compositions containing the polypropylene resin composition of the present invention and the above additives are more preferable for the various automobile materials or home electric materials.

Example

The present invention is explained with the following Examples and Comparative Examples. Respective physical property values in Examples and Comparative Examples were measured according to the following methods.

(1) Melting Temperature (Tm, Unit: ° C.)

It was measured according to a method comprising the steps of:

hot-press molding a propylene homopolymer by preheating at 230° C. for 5 minutes, raising a pressure up to 50 kgf/cm$^2$ for 3 minutes, keeping the pressure of 50 kgf/cm$^2$ for 2 minutes, and then cooling at 30° C. for 5 minutes under a pressure of 30 kgf/cm$^2$, thereby preparing a 0.5 mm-thick sheet;

measuring with a differential scanning calorimeter DSC Q100 manufactured by TA Instruments by heating 10 mg of the above sheet at 220° C. for 5 minutes in a nitrogen atmosphere, cooling down to 150° C. at a temperature-falling rate of 300° C./minute, keeping at 150° C. for 1 minute, further cooling down to 50° C. at a temperature-falling rate of 5° C./minute, keeping at 50° C. for 1 minute, and then heating from 50° C. to 180° C. at a temperature-rising rate of 5° C./minute, thereby obtaining a melting curve; and measuring a temperature (° C.) showing the largest endothermic peak.

(2) Proportion of Regio Defects

A "proportion of regio defects resulted from a 2,1-insertion and a 1,3-insertion in all propylene units" of a propylene homopolymer was obtained from a $^{13}$C-NMR spectrum measured under the following conditions according to descriptions in POLYMER, 30, 1350 (1989) by Tsutsui, et al., wherein a sample for the $^{13}$C-NMR measurement was prepared by dissolving homogeneously about 200 mg of a propylene homopolymer in 3 mL of o-dichlorobenzene using a 10 mm-Φ test tube:

apparatus: Bruker ADVANCE 600,
measurement temperature: 135° C.,
pulse repetition time: 10 seconds,
pulse width: 450, and
cumulated number: 2,500.

(3) Content (A) (Unit: % by Weight) of Ethylene-α-Olefin Random Copolymer (RCP) in Polypropylene Resin Composition, and Content (Unit: % by Weight) of α-Olefin in Ethylene-α-Olefin Random Copolymer They were obtained from a $^{13}$C-NMR spectrum measured under the following conditions according to descriptions in Macromolecules, 15, 1150-1152 (1982) by Kakugo, et al., wherein a sample for the $^{13}$C-NMR measurement was prepared by dissolving homogeneously about 200 mg of a propylene homopolymer in 3 mL of o-dichlorobenzene using a 10 mm-Φ test tube:

apparatus: EX270 manufactured by JEOL DATUM LTD.,
measurement temperature: 135° C.,
pulse repetition time: 10 seconds,
flip angle: 45°, and flip angle
cumulated number: 2,500.

(4) Amount (B) (Unit: % by Weight) of Soluble Parts (CXS) in Xylene at 20° C. Contained in Polypropylene Resin Composition It was measured according to a method comprising the steps of:

adding 200 mL of xylene to 1 g of a polypropylene resin composition;

boiling the mixture to dissolve all of the polypropylene resin composition;

cooling the solution;

keeping the solution at 20° C. for 1 hour or more;

separating soluble parts and insoluble parts with each other with a filter paper;

distilling the solvent contained in the filtrate away to dryness, thereby obtaining soluble parts;

weighing the soluble parts, and calculating the amount (B) based thereon.

(5) Molecular Weight Distribution (Aw/An)

It was determined by obtaining a weight-average molecular chain length (Aw) and a number-average molecular chain length (An) according to GPC measured under the following conditions, and then calculating the ratio (Aw/An):

apparatus: type 150C manufactured by Waters Corporation;

column: TSK-GEL GMH6-HT, 7.5 Φmm×300 mm×3 columns;

measurement temperature: 140° C.;

solvent: o-dichlorobenzene; and measurement concentration: 5 mg/5 mL.

(6) Intrinsic Viscosity ([η]) (Unit: dl/g)

It was obtained according to a method comprising the steps of:

measuring respective reduced viscosities of TETRALINE solutions having concentrations of 0.1 g/dl, 0.2 g/dl and 0.5 g/dl, at 135° C. with an Ubbellohde viscometer; and calculating an intrinsic viscosity according to a method described in "Kobunshi yoeki, Kobunshi jikkengaku 11" (published by Kyoritsu Shuppan Co. Ltd. in 1982), section 491, namely, by plotting those reduced viscosities for those concentrations, and then extrapolating the concentration to zero.

(7) Volume-Average Particle Diameter (Dv) (Unit: μm) of Dispersed Particles of Ethylene-α-Olefin Random Copolymer Contained in Polypropylene Resin Composition, Provided that Cross-Section of Those Particles has Round Shape It was measured according to a method comprising the steps of:

hot press-molding a polypropylene resin composition at 190° C. for 3 minutes under a pressure of 35 kgf/cm², thereby preparing a 0.5 mm-thick test piece;

cutting out the test piece along its cross-section at −80° C. with a microtome knife;

dyeing at 60° C. for 90 minutes with a ruthenium acid vapor;

cutting at −50° C. with a diamond cutter, thereby making a 800 Å-thick ultrathin slice;

observing the ultrathin slice at 3,000-fold magnification with a transmission electron microscopy, type H-8000, manufactured by Hitachi, Ltd., wherein black color-dyed parts correspond to the ethylene-α-olefin random copolymer;

photographing three different visual fields of the transmission electron microscopy;

image-treating those photographs with a highly accurate image-editing software "IP-1000" manufactured by Asahi Engineering. Co., Ltd., as mentioned below, thereby measuring the captioned volume-average particle diameter (Dv).

(Image-Treating)

It was carried out according to a method comprising the steps of:

introducing the above photographs into a computer with a scanner GT-9600 manufactured by Epson Corp. (100 dpi, 8 bit);

digitizing with a highly accurate image-editing software "IP-1000" manufactured by Asahi Engineering. Co., Ltd., thereby obtaining an analysis area of 1,1116 μm²;

obtaining a diameter of a circle having the same area as that of the ethylene-α-olefin random copolymer part (circle-corresponding particle diameter: Di, unit: μm), because dispersed particles corresponding to the ethylene-α-olefin random copolymer part have an irregular shape; and calculating the captioned volume-average particle diameter (Dv) according to the following formula, $$Dv = \frac{\sum_{i=1}^{n} Di^4}{\sum_{i=1}^{n} Di^3}$$

wherein i is an integer of 1 to n, and Di is a circle-corresponding particle diameter of each particle.

(8) Elongation Modulus (Unit: MPa) and Elongation Impact Strength (Unit: kg·cm/cm) of Polypropylene Resin Composition Its elongation modulus and elongation impact strength were measured according to a method comprising the steps of:

hot press-molding at 190° C. for 3 minutes under a pressure of 35 kgf/cm², thereby preparing a 0.5 mm-thick press sheet;

making a test piece from the sheet; and measuring according to a method prescribed in ASTM D1822-L with a single-column typed tensile-compression testing machine, STA-1225, manufactured by A&D Company, Limited.

Preparation Example 1

Propylene Homopolymer (HPP)

(1-1) Polymerization of HPP-1

The polymerization was carried out according to a method described in Examples of JP 2002-012734A (corresponding to US 2002035209A), thereby obtaining a polymer having an intrinsic viscosity of 1.18 dl/g.

(1-2) Polymerization of HPP-2

To 40 mL of toluene, under a nitrogen gas atmosphere, there were added 6.6 mg of a catalyst component (A) (dimethylsilanedilylbis(2-methyl-4-naphthylindenyl) zirconium dichloride), and 1 ml of a toluene solution of triisobutylaluminum having a concentration of 1 mmol/mL. In the resultant toluene solution, 150.3 mg of a catalyst component (B) was suspended, thereby preparing a toluene slurry of polymerization catalyst components, the catalyst component (B) being synthesized according to a method described in Example 1 (2) of JP 2003-171412A.

A stainless steel autoclave having a 3-liter inner volume and equipped with a stirrer was dried under a reduced pressure, and was purged with a nitrogen gas. The autoclave was cooled, and then was evacuated. The above toluene slurry of polymerization catalyst components was introduced into the autoclave. Then, 0.030 MPa of hydrogen and 780 g of propylene were introduced into the autoclave. An inner temperature of the autoclave was regulated to keep 20° C., and the resultant mixture was stirred for 5 minutes at 20° C. The autoclave was heated up to 65° C., and was stirred for 30 minutes, thereby obtaining 267.5 g of a propylene homopolymer (HPP-2). Its intrinsic viscosity was 1.75 dl/g.

Preparation Example 2

Ethylene-α-Olefin Random Copolymer (RCP)

(2-1) RCP-1 (Ethylene-Propylene Random Copolymer)

To 40 mL of toluene, under a nitrogen gas atmosphere, there were added 5 mg of a catalyst component (C) (dimethylsilylene(tetramethylcyclopentadienyl)(3-tert-butyl-5-methyl-phenoxy)titanium dimethoxide) (metal complex described in Comparative Example 1 of JP 2006-193749A), and 1 ml of a toluene solution of triisobutylaluminum having a concentration of 1 mmol/mL, thereby preparing a toluene solution.

A stainless steel autoclave having a 3-liter inner volume and equipped with a stirrer was dried under a reduced pressure, and was purged with a nitrogen gas. The autoclave was cooled, and then was evacuated. The above toluene solution of the catalyst, 1,000 mL of toluene, 42 g of ethylene and 28 g of propylene were introduced into the autoclave. Then, 3.8 mL of a toluene solution (concentration: 1 mmol/mL) of triphenylcarbenium tetrakispentafluorophenylborate was added thereto. The autoclave was raised up to 80° C. in its inner temperature, and was stirred for 90 minutes, thereby obtaining 69 g of an ethylene-propylene random copolymer. An α-olefin (propylene) content of the obtained polymer was 34% by weight, and an intrinsic viscosity thereof was 3.28.

(2-2) RCP-2 (Ethylene-Butene Random Copolymer)

There was used an ethylene-butene random copolymer, TAFMER A2050S, manufactured by Mitsui Chemicals, Inc., its α-olefin (butene) content being 33% by weight.

(2-3) RCP-3 (Ethylene-Propylene Random Copolymer)

A stainless steel autoclave having a 3-liter inner volume and equipped with a stirrer was dried under a reduced pressure, and was purged with a nitrogen gas. The autoclave was cooled, and then was evacuated. There was introduced 1,000 mL of heptane into the autoclave. There were contacted with one another 4.4 mmol of triethylaluminum, 0.44 mmol of tert-butyl-n-propyldimethoxysilane, and 11.7 mg of a solid catalyst component described in JP 2004-182981A, Example 1 (2), in heptane contained in a glass charger, and the contacted product was added all together to the above autoclave.

A 24-liter inner volume cylinder connected to the above 3-liter autoclave was evacuated, and 260 g of ethylene, 170 g of propylene and 0.01 MPa of hydrogen were added to the cylinder. The cylinder was heated up to 80° C., thereby preparing a mixed gas thereof. The mixed gas was fed continuously to the above 3-liter autoclave, and polymerization was carried out for 3 hours at 70° C. under a pressure of 0.3 MPa, thereby obtaining 118 g of a polymer. An α-olefin (propylene) content of the obtained polymer was 32% by weight, and an intrinsic viscosity thereof was 2.61.

Example 1

There were dissolved 15 g of HPP-1 as the propylene homopolymer and 5 g of RCP-1 as the ethylene-α-olefin random copolymer in 200 ml of boiling xylene. The xylene solution was poured into 14 liters of methanol. Then, the precipitate was filtered and dried, thereby obtaining 20 g of a polypropylene resin composition (BCPP-1) containing HPP-1 and RCP-1. Table 1 shows measurement results of respective property values of BCPP-1.

Example 2

Example 1 was repeated except that 16 g of HPP-1 and 4 g of RCP-2 were used, respectively, thereby obtaining 20 g of a polypropylene resin composition (BCPP-2). Table 1 shows measurement results of respective property values of BCPP-2.

Comparative Example 1

Example 1 was repeated except that 15 g of HPP-2 and 5 g of RCP-1 were used, respectively, thereby obtaining 20 g of a polypropylene resin composition (BCPP-3). Table 1 shows measurement results of respective property values of BCPP-3.

Comparative Example 2

Example 1 was repeated except that 15 g of HPP-1 and 5 g of RCP-3 were used, respectively, thereby obtaining 20 g of a polypropylene resin composition (BCPP-4). Table 1 shows measurement results of respective property values of BCPP-4.

TABLE 1

| | Example | | Comparative Example | |
|---|---|---|---|---|
| | 1 | 2 | 1 | 2 |
| Polypropylene resin composition | BCPP-1 | BCPP-2 | BCPP-3 | BCPP-4 |
| HPP/RCP (wt %/wt %) | 75/25 | 80/20 | 75/25 | 75/25 |
| HPP | HPP-1 | HPP-1 | HPP-2 | HPP-1 |
| Melting temperature (□) | 163 | 163 | 151 | 163 |
| Proportion of regio defects | <0.01 | <0.01 | 0.81 | <0.01 |
| RCP | RCP-1 | RCP-2 | RCP-1 | RCP-3 |
| Kind of α-olefin | propylene | butene | propylene | propylene |
| α-olefin content (wt %) | 36 | 33 | 36 | 32 |
| Molecular weight distribution | 2.1 | 2.0 | 2.1 | 4.9 |
| Viscosity (dl/g) | 3.3 | 2.1 | 3.3 | 2.6 |
| RCP content (A) (wt %) | 25 | 18 | 27 | 23 |
| Amount of soluble parts in xylene at room temperature (B) (wt %) | 26 | 21 | 25 | 16 |
| B/A | 1.0 | 1.2 | 0.9 | 0.7 |
| Dv (μm) | 0.5 | 0.8 | 0.8 | 1.5 |
| Elongation modulus (MPa) | 612 | 638 | 471 | 554 |
| Elongation impact strength (kg · cm/cm) | 168 | 102 | 408 | 130 |

INDUSTRIAL APPLICABILITY

The polypropylene resin composition of the present invention is molded to obtain molded articles excellent in their stiffness and impact resistance.

The invention claimed is:

1. A polypropylene resin composition comprising:
   60 to 85% by weight of a propylene homopolymer; and
   15 to 40% by weight of an ethylene-α-olefin random copolymer containing 45 to 70 parts by weight of ethylene units, and 30 to 55 parts by weight of α-olefin units, and satisfying the following requirements (1) to (5),
   (1) the above propylene homopolymer has a melting temperature of 163 to 170° C. measured according to DSC;
   (2) the above propylene homopolymer contains 0.01% or less of regio defects measured by a $^{13}$C-NMR spectrum, the regio defects being resulted from a 2,1-insertion and a 1,3-insertion, provided that the total of propylene units in the above propylene homopolymer is 100%;
   (3) the above polypropylene resin composition has a ratio B/A of 0.9 or more, provided that A (% by weight) is an amount of the above ethylene-α-olefin random copolymer contained in the above polypropylene resin composition, and B (% by weight) is an amount of soluble parts in xylene at a room temperature contained in the above polypropylene resin composition;

(4) the above ethylene-α-olefin random copolymer has a molecular weight distribution of 2.0 to 4.0; and (5) the above ethylene-α-olefin random copolymer contained in the above polypropylene resin composition has a shape of a particle, whose volume-average particle diameter is 1.0 μm or less, measured by observing a cross-section of a 0.5 mm-thick sheet with a transmission electron microscopy, the sheet being obtained by hot press-molding the above polypropylene resin composition at 190° C. for 3 minutes under a pressure of 35 kgf/cm², provided that the cross-section of the above particle has a round shape;

wherein the total of the above propylene homopolymer and the above ethylene-α-olefin random copolymer is 100% by weight, and the total of the above ethylene units and the above α-olefin units is 100 parts by weight.

2. A molded article comprising the polypropylene resin composition of claim 1.

* * * * *